Dec. 27, 1932.   F. A. SMITH   1,892,192
FENDERWELL LOCK FOR SPARE WHEELS OR TIRES
Filed June 22, 1931
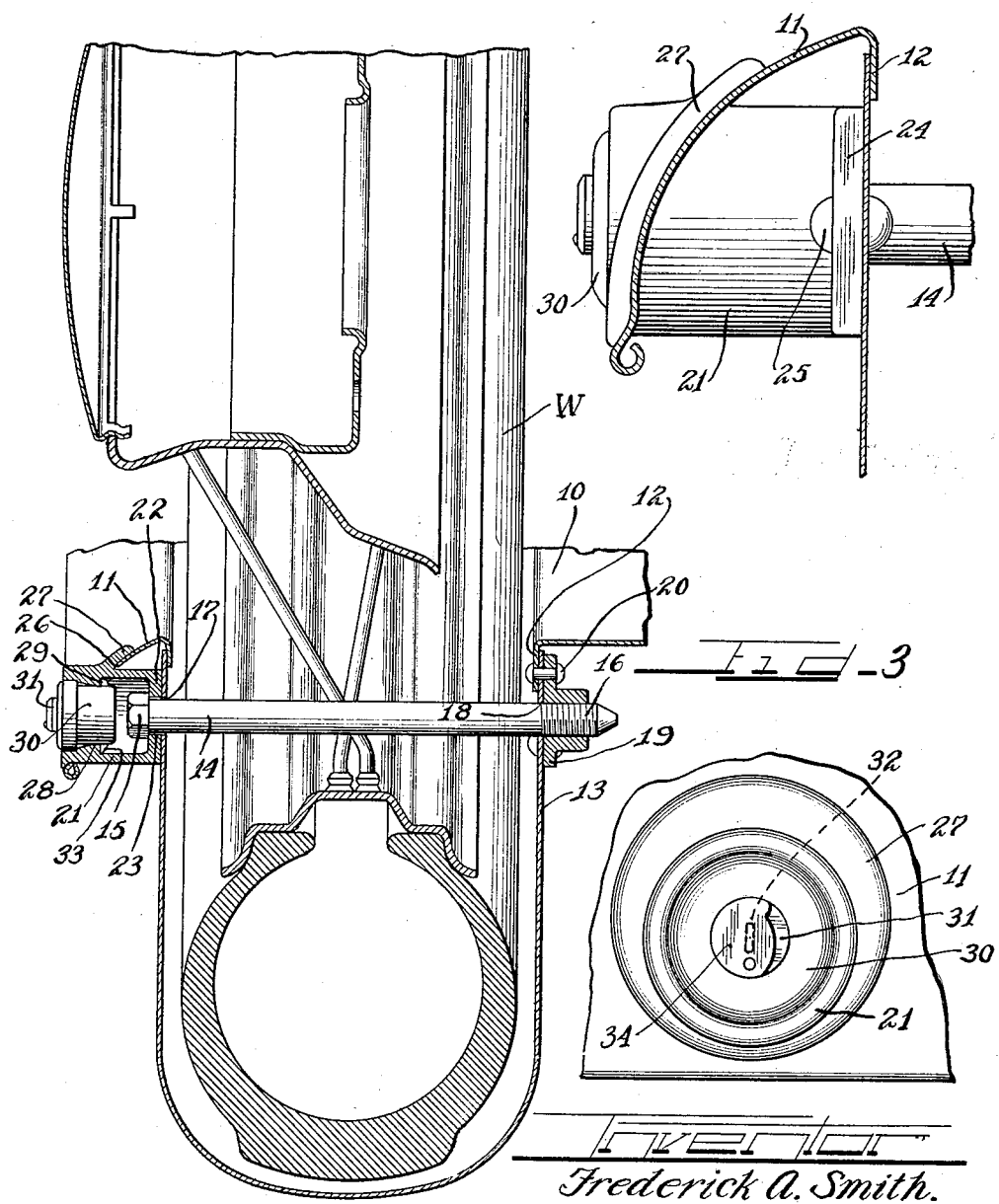
Inventor
Frederick A. Smith.
by Charles Hill
Attys.

Patented Dec. 27, 1932

1,892,192

UNITED STATES PATENT OFFICE

FREDERICK A. SMITH, OF NORTH CHICAGO, ILLINOIS, ASSIGNOR TO OAKES PRODUCTS CORPORATION, OF NORTH CHICAGO, ILLINOIS, A CORPORATION OF MICHIGAN

FENDERWELL LOCK FOR SPARE WHEELS OR TIRES

Application filed June 22, 1931. Serial No. 545,942.

My invention relates to locking mechanisms particularly applicable to fenderwells for locking spare wheels or tires therein against theft.

My improved locking means is of the type comprising a locking bolt or bar for extension transversely of a tire well above the lower part of the tire or wheel rim. Heretofore these tire wells have been comparatively shallow and the locking bar or bolt fittings or fixtures were supported on top of the fender adjacent to the well. The trend is now toward deeper wells and the object of my invention is to adapt locking mechanism for such deeper wells so that the locking bar or bolt may be sufficiently close to the wheel or tire rim to hold it in position within the well.

The main feature of the invention is to apply the locking bar or bolt supporting fittings at the outer sides of the tire or wheel receiving well and below the fender body, such application of the fittings not only bringing the locking bar or bolt into proper locking position but also removing the fittings from the top of the fender where they might act as obstructions, and also producing a more desirable and neater appearance.

A further object of the invention is to provide a locking element in the form of a bolt for extending across the well, with a lock housing or guard receiving the bolt head and located below the outer side skirt of the fender, with a key controlled closure for the lock housing for preventing access to the bolt after it has been applied in locking position.

The features of my invention are incorporated in the structure disclosed on the drawing, in which drawing Figure 1 is a vertical diametral section through a spare wheel and a fenderwell and the locking mechanism;

Figure 2 is an enlarged side elevation of the outer end of the locking mechanism with the fender and the well in vertical cross section; and Figure 3 is a front elevation of the lock housing and lock.

On the drawing the fender shown is one of the front fenders of a car and has along its outer side the skirt or roll 11. The fender is cut away to leave an opening around which the fender material is deflected downwardly to form a strengthening and supporting flange 12, to which the well 13 is secured to be suspended below the fender and shaped longitudinally to fit and receive a spare wheel or tire, the drawing showing a spare wheel W in the well.

The locking means shown comprises a bolt 14 having the polygonal head 15 and the threaded end 16. In the outer and inner walls of the well 13 are the holes 17 and 18 respectively for receiving the bolt, these holes being located so that when the bolt is applied it will be adjacent to the wheel or tire rim at the lower part thereof.

On the inner wall of the well a fitting 19 is secured as by means of rivets 20, or by welding. This fitting is threaded to receive the threaded end 16 of the bolt, and the bolt end may be tapered or pointed as shown in order that it may be readily guided through the opening 18 into the threaded fitting.

In front of the outer wall of the well and below the skirt 11 of the fender is a guard or housing 21 which may be in the form of a cylindrical cup whose base 22 forms a washer for the bolt head 15 and has the hole 23 therethrough for receiving the bolt shank. The housing has lateral flanges 24 by means of which it may be secured against the outer wall of the well by welding, or as shown by means of rivets 25.

The fender skirt or roll 11 has the opening 26 through which the lock housing may be inserted, and the housing is surrounded by the outer lateral flange 27 which is shaped to accurately fit the curvature of the fender skirt around the opening 26 therethrough so that this flange forms a sort of escutcheon for the lock housing as well as forming a further support therefor.

The lock housing has the cylindrical throat 28 at the inner end of which is the annular shoulder 29, and this throat is closed by a cylindrical lock frame or plug 30 within which a lock cylinder 31 is rotatable by a suitable key insertable through a keyhole 32. The lock may be of any well known construction comprising radially shiftable lock bars 33 normally distended by springs (not shown) and retracted inwardly when a key is inserted in the lock and turned. The lock bolts are beveled and so located that when the lock plug is inserted in the throat of the lock housing the lock bars will be shifted inwardly until they pass the shoulder 29, when they will be deflected outwardly by their springs behind the shoulder to thus lock the lock plug against removal and to close the housing against insertion therein of a wrench or other tool for turning the lock bolt 14.

By means of a suitable key the lock bolt may be withdrawn and the locking plug removed from the housing and then by means of a suitable wrench the fenderwell lock bolt 14 may be turned to be released from the fitting 19 and then the bolt may be entirely withdrawn through the throat of the housing, and the tire or wheel is then freed so that it may be lifted out of the well. When a wheel or tire is again to be locked in the well the lock bolt 14 is inserted through the lock housing 21 and into the fitting 19 and then by means of a suitable wrench the bolt is turned into locking position. The lock plug is then snapped into the lock housing throat and the bolt is guarded and locked against removal. A shield 34 may be pivoted on the outer end of the lock barrel for closing and protecting the keyhole against the weather.

I have shown a practical and efficient embodiment of the features of my invention but I do not desire to be limited to the exact construction and arrangement shown as changes and modifications may be made without departing from the scope and principles of the invention as defined in the appended claims.

I claim as follows:

1. The combination with a fender having a depending skirt or roll along its outer edge and a frame depending from said fender adjacent to said skirt forming a well for receiving a spare wheel or tire, aligned openings in the front and rear wall of said well frame below the top wall of the fender, a fitting rigidly secured to the front wall of the well frame and having an opening in its inner wall in alignment with the well frame passageways, a bolt shiftable through said fitting opening and well wall passageways to extend transversely through said well below the top thereof, and to prevent unauthorized removal of a spare wheel or tire, the head of said bolt being within said fitting, said skirt having an opening through which the outer end of said fitting projects, a flange on said fitting formed to intimately engage against the outer side of said skirt to strengthen said skirt, and lock mechanism on said fitting for preventing access to the bolt head therein.

2. The combination with a fender having a skirt along its outer edge and a frame depending therefrom forming a well adjacent to said skirt for receiving a spare wheel or tire, bolt holes in the front and rear walls of said well frame below the top wall of the fender, a fitting rigidly secured to the front wall of the well frame and having a bolt hole through its rear wall in alignment with the bolt holes of the well walls, a locking bolt having its head within said fitting and its shank extending through said holes and across said well below the top thereof for preventing unauthorized removal of a spare wheel or tire from the well, said skirt having an opening through which the outer end of said fitting projects, a flange surrounding the outer end of said fitting and shaped to intimately fit against the outer face of said skirt and being secured thereto, whereby said fitting will form a strengthening brace between the front well wall and said skirt and will reinforce said skirt around the opening therethrough, and locking means for locking said fitting against access to the bolt head.

In testimony whereof I have hereunto subscribed my name at North Chicago, Lake County, Illinois.

FREDERICK A. SMITH.